United States Patent
Spaether et al.

(10) Patent No.: US 6,524,995 B2
(45) Date of Patent: Feb. 25, 2003

(54) CATALYST SYSTEMS OF THE ZIEGLER-NATTA TYPE

(75) Inventors: Wolf Spaether, Ilvesheim (DE); Stephan Hüffer, Ludwigshafen (DE); John Lynch, Monsheim (DE); Wolfgang Bidell, Mutterstadt (DE); Joachim Rösch, Ludwigshafen (DE); Günther Schweier, Friedelsheim (DE); Roland Hingmann, Barcelona (ES); Alexandre Segul, Tarragona (ES); Rainer Hemmerich, Grünstadt (DE); Ingo Treffkorn, Hagenbach (DE)

(73) Assignee: Basell Polypropylene GmbH, Mainz (DE)

( * ) Notice: Subject to any disclaimer, the term of this patent is extended or adjusted under 35 U.S.C. 154(b) by 209 days.

(21) Appl. No.: 09/750,715

(22) Filed: Jan. 2, 2001

(65) Prior Publication Data

US 2001/0020073 A1 Sep. 6, 2001

(30) Foreign Application Priority Data

Jan. 21, 2000 (DE) .......................... 100 02 653

(51) Int. Cl.$^7$ ................................ B01J 23/02
(52) U.S. Cl. .................. 502/341; 502/351; 502/354
(58) Field of Search ................ 502/103, 341, 502/351, 354; 525/240; 526/351

(56) References Cited

U.S. PATENT DOCUMENTS 6,107,231 A * 8/2000 Huffer et al. ............... 502/103
6,200,922 B1 3/2001 Hüffer et al. ............... 502/120

FOREIGN PATENT DOCUMENTS

| AU | 708459 | 2/1997 |
|---|---|---|
| EP | 761 696 | 3/1997 |
| EP | 0761 696 | 3/1997 |
| EP | 0 812 861 | 12/1997 |
| WO | 96/05236 | 2/1996 |
| WO | 97/48742 | 12/1997 |
| WO | 97/48743 | 12/1997 |

* cited by examiner

Primary Examiner—Stanley S. Silverman
Assistant Examiner—Edward M. Johnson
(74) Attorney, Agent, or Firm—Keil & Weinkauf

(57) ABSTRACT

Catalyst systems of the Ziegler-Natta type comprise as active constituents a) a solid component comprising a compound of titanium or vanadium, a compound of magnesium, a particulate inorganic oxide as support and an internal electron donor compound, and as cocatalyst b) an aluminum compound and c) if desired, a further, external electron donor compound, wherein the particulate, inorganic oxide used has a specific surface area of from 350 to 1000 m$^2$/g and a mean particle diameter $\bar{D}$ in the range from 5 to 60 μm and comprises particles which are composed of primary particles having a mean particle diameter $\bar{d}$ in the range from 1 to 10 μm and contain voids or channels between the primary particles, where the macroscopic proportion of voids or channels having a diameter of greater than 1 μm in the particles of the inorganic oxides is in the range from 5 to 30% by volume and the molar ratio of the compound of magnesium to the particulate, inorganic oxide is from 0.5:1 to 2.0:1.

10 Claims, No Drawings

CATALYST SYSTEMS OF THE ZIEGLER-NATTA TYPE

The present invention relates to novel catalyst systems of the Ziegler-Natta type comprising as active constituents a) a solid component comprising a compound of titanium or vanadium, a compound of magnesium, a particulate inorganic oxide as support and an internal electron donor compound, and as cocatalyst b) an aluminum compound and c) if desired, a further, external electron donor compound, wherein the particulate, inorganic oxide used has a specific surface area of from 350 to 1000 m²/g and a mean particle diameter $\overline{D}$ in the range from 5 to 60 μm and comprises particles which are composed of primary particles having a mean particle diameter $\overline{d}$ in the range from 1 to 10 μm and contain voids or channels between the primary particles, where the macroscopic proportion of voids or channels having a diameter of greater than 1 μm in the particles of the inorganic oxides is in the range from 5 to 30% by volume and the molar ratio of the compound of magnesium to the particulate, inorganic oxide is from 0.5:1 to 2.0:1.

The present invention also relates to a process for preparing homopolymers and copolymers of propylene with the aid of such catalyst systems, to the homopolymers and copolymers of propylene obtainable in this way, to their use for producing films, fibers or moldings and to the films, fibers or moldings themselves.

WO 96/05236 describes a supported catalyst component comprising a magnesium halide and, as support, a particulate solid which has a specific surface area of from 10 to 1000 m²/g and in which the majority of the support particles are in the form of agglomerates of subparticles. Such catalyst components make it possible to prepare 1-alkene polymers having a good morphology and bulk density at high catalyst efficiency.

EP-A 761 696 relates to catalyst systems of the Ziegler-Natta type comprising, as supports, particulate silica gels which have a mean particle diameter of from 5 to 200 μm, a mean particle diameter of the primary particles of from 1 to 10 μm and voids or channels which have a mean diameter of from 1 to 10 μm and whose macroscopic proportion by volume in the total particle is in the range from 5 to 20%. The catalyst systems have a high productivity and stereospecificity in the polymerization of $C_2$–$C_{10}$-alk-1-enes and films produced from such polymers have a reduced tendency to form microspecks, i.e. small irregularities in the surface of the films.

WO 97/48742 discloses loosely aggregated catalyst support compositions which have a particle size of from 2 to 250 μm and a specific surface area of from 100 to 1000 m²/g, where the support particles comprise particles having a mean particle size of less than 30 μm and a binder which loosely binds these particles to one another. The polymerization catalysts obtainable from such catalyst supports have a high activity and lead to homogeneous polymers from which films having a good appearance can be produced.

WO 97/48743 relates to crumbly, agglomerated catalyst support particles which have a mean particle size of from 2 to 250 μm and a specific surface area of from 1 to 1000 m²/g and which are produced by spray drying primary particles having a mean particle size of from 3 to 10 μm. The characteristic feature of these agglomerated catalyst support particles is that at least 80% by volume of the agglomerated particles which are smaller than the $D_{90}$ of the original particle size distribution have a microspherical morphology. (The $D_{90}$ indicates that 90% by volume of the particles have a smaller diameter.) The microspherical agglomerated catalyst support particles have interstitial voids of uniform size and distribution within the particle; at least some of the voids penetrate the particle surface and thus form at least 10 channels from the surface to the interior of the agglomerated particles. The polymerization catalysts obtainable from these catalyst supports also have a high activity and allow the production of films having a good appearance.

Although the polymers prepared using polymerization catalysts corresponding to the prior art described by and large meet the requirements in respect of film quality, the proportion of microspecks or troublesome impurities is still capable of significant improvement, especially compared to polymers which have been produced using catalyst systems containing no inorganic oxides as support.

Furthermore, in the production of fibers from polymers of propylene, it is necessary for economic reasons to achieve a significant increase in the operating lives of the filters for liquid polypropylene upstream of the spinnerets. These operating lives are significantly lower in the case of polypropylene which has been prepared using supported catalysts than in the case of polypropylene which has been obtained using an unsupported catalyst.

However, the advantages in respect of polymer morphology which result from the use of the inorganic oxides should be retained. In addition, there is always a need to achieve higher catalyst productivities.

It is an object of the present invention to remedy the abovementioned disadvantages and to develop improved catalyst systems of the Ziegler-Natta type which have significantly improved productivity and which make it possible to obtain polymers of 1-alkenes having a good morphology and a high bulk density from which it is possible to produce, inter alia, films having a reduced tendency to form microspecks and fibers having less troublesome contamination, which leads to an increase in the operating lives of the polymer melt filtration screens.

We have found that this object is achieved by the catalyst systems defined at the outset, and also by the process for preparing polymers of propylene, their use for producing films, fibers or moldings and also the films and fibers or moldings made of these polymers.

The catalyst systems of the present invention comprise a solid component a) and also a cocatalyst. A suitable cocatalyst is the aluminum compound b). Preferably, in addition to this aluminum compound b), an electron donor compound c) is additionally used as a further constituent of the cocatalyst.

According to the present invention, the catalyst system is prepared using at least one particulate inorganic oxide which has a specific surface area of from 350 to 1000 m²/g, preferably from 400 to 700 m²/g and in particular from 450 to 600 m²/g, determined by nitrogen adsorption in accordance with DIN 66131.

The inorganic oxides to be used according to the present invention have a mean particle diameter $\overline{D}$ of from 5 to 60 μm, preferably from 15 to 60 μm and in particular from 20 to 60 μm. Here, the mean particle diameter $\overline{D}$ is the volume-based mean (median) of the particle size distribution determined by Coulter Counter analysis in accordance with ASTM Standard D 4438.

The particles of the inorganic oxides are composed of primary particles which have a mean particle diameter $\overline{d}$ of from 1 to 10 μm, preferably from 3 to 10 μm and in particular from 4 to 8 μm. These primary particles are porous, granular oxide particles which are generally obtained by dry and/or wet milling from a hydrogel of the inorganic oxide. It is also possible to sieve the primary particles before they are processed further.

In addition, the inorganic oxides have voids or channels which have a diameter of greater than 1 μm and whose macroscopic proportion in the particles of the inorganic oxides is in the range from 5 to 30% by volume, in particular from 10 to 25% by volume. It is also advantageous for them to meet at least one of the following conditions:

i) less than 10% by volume and preferably less than 8% by volume of the primary particles have a particle diameter d of greater than 15 μm or ii) less than 5% by volume and preferably less than 3% by volume of the primary particles have a particle diameter d of greater than 20 μm.

The mean particle diameter $\bar{d}$ of the primary particles, the distribution of the particle diameters d of the primary particles and the macroscopic proportion of the voids or channels having a diameter of greater than 1 μm are determined by image analysis of scanning electron micrographs of cross sections of the inorganic oxide particles. Evaluation is carried out by conversion of the halftone image obtained by electron microscopy into a binary image and digital evaluation by means of an appropriate EDP program. Here, the particles are "electronically" fragmented, i.e. primary particles which are in contact are separated from one another by means of a sequence of mathematical operations. It is then possible to classify the separated particles electronically according to size and to count them. This gives a precise particle size distribution of the primary particles and indicates the proportion of coarse primary particles having particle sizes d of greater than 15 μm or 20 μm in the particulate inorganic oxide examined. In addition, the precise proportion of voids or channels having a diameter of greater than 15 μm or 20 μm within the particles can be determined in the course of the analytical evaluation. Preferably, at least 100 of the particles composed of primary particles are analyzed so as to obtain a sufficiently large number of particles for reproducibly good statistical evaluation. This means that a number of images of cross sections (scanning electron micrographs) have to be employed.

The inorganic oxides can be obtained, for example, by spray drying the milled hydrogels, which are for this purpose mixed with water or an aliphatic alcohol. Spray drying can be carried out using a binder which promotes the particle formation process during spray drying and/or improves the cohesion of the primary particles in the particles of the inorganic oxide. As binder, it is possible to use particularly fine, e.g. colloidal, particles of the inorganic oxides. However, it is also possible to add auxiliaries, for example polymers such as cellulose derivatives, polystyrene or polymethyl methacrylate, as binder. The particles obtained in this way generally have a spheroidal, i.e. sphere-like, shape.

Suitable inorganic oxides are, first and foremost, the oxides of silicon, aluminum, titanium, zirconium or one of the metals of main groups I and II of the Periodic Table, or mixtures of such oxides. Preferred oxides are, for example, aluminum oxide, aluminum phosphate, magnesium oxide or sheet silicates. Particular preference is giving to using silicon oxide (silica gel). It is also possible to use mixed oxides such as aluminum silicates or magnesium silicates.

The particulate inorganic oxides usually have pore volumes of from 0.1 to 10 $cm^3/g$, preferably from 1.0 to 4.0 $cm^3/g$, measured by mercury porosimetry in accordance with DIN 66133 and by nitrogen adsorption in accordance with DIN 66131.

Depending on the process by which the particulate inorganic oxides are prepared, their pH, i.e. the negative logarithm to the base ten of the proton concentration, can assume various values. It is preferably in the range from 3.0 to 9.0, in particular from 4.0 to 7.5 and particularly preferably from 4.0 to 7.0. The pH of the particulate inorganic oxides is generally determined by the method described in S. R. Morrison, "The Chemical Physics of Surfaces", Plenum Press, New York [1977], page 130 et seq.

After they have been prepared, the inorganic oxides frequently have hydroxyl groups on their surface. Removal of water makes it possible to reduce or completely eliminate the content of OH groups. This can be achieved by thermal or chemical treatment. Thermal treatment is usually carried out by heating the inorganic oxide for from 1 to 24 hours, preferably from 2 to 20 hours and in particular from 3 to 12 hours, at from 250 to 900° C., preferably from 600 to 800° C. The hydroxyl groups can also be removed by chemical means by treating the inorganic oxides with customary desiccants such as $SiCl_4$, chlorosilanes or aluminum alkyls. Preferred inorganic oxides contain from 0.5 to 5% by weight of water. The water content is usually determined by drying the inorganic oxide to constant weight at 160° C. under atmospheric pressure. The weight loss corresponds to the original water content.

In addition to the particulate inorganic oxide as support, the solid component a) comprises, inter alia, compounds of titanium or vanadium.

Titanium compounds used are generally the halides or alkoxides of trivalent or tetravalent titanium. Titanium alkoxide halide compounds or mixtures of various titanium compounds are also possible. Examples of suitable titanium compounds are $TiBr_3$, $TiBr_4$, $TiCl_3$, $TiCl_4$, $Ti(OCH_3)Cl_3$, $Ti(OC_2H_5)Cl_3$, $Ti(O-iso-C_3H_7)Cl_3$, $Ti(O-n-C_4H_9)Cl_3$, $Ti(OC_2H_5)Br_3$, $Ti(O-n-C_4H_9)Br_3$, $Ti(OCH_3)_2Cl_2$, $Ti(OC_2H_5)_2Cl_2$, $Ti(O-n-C_4H_9)_2Cl_2$, $Ti(OC_2H_5)_2Br_2$, $Ti(OCH_3)_3Cl$, $Ti(OC_2H_5)_3Cl$, $Ti(O-n-C_4H_9)_3Cl$, $Ti(OC_2H_5)_3Br$, $Ti(OCH_3)_4$, $Ti(OC_2H_5)_4$ or $Ti(O-n-C_4H_9)_4$. Preference is given to using those titanium compounds which contain chlorine as halogen. Also preferred are titanium halides consisting of only halogen and titanium, and among these especially the titanium chlorides and in particular titanium tetrachloride. Among the vanadium compounds, particular mention may be made of vanadium halides, vanadium oxyhalides, vanadium alkoxides and vanadium acetylacetonates. The vanadium compounds are preferably in the oxidation states 3 to 5.

In the preparation of the solid component a), additional use is preferably made of at least one compound of magnesium. Suitable compounds of magnesium are halogen-containing magnesium compounds such as magnesium halides, in particular the chlorides or bromides, or magnesium compounds from which the magnesium halides can be obtained in a customary manner, e.g. by reaction with halogenating agents. In the present context, halogens are chlorine, bromine, iodine or fluorine or mixtures of two or more thereof, with preference being given to chlorine or bromine and particular preference being given to chlorine.

Particularly useful halogen-containing magnesium compounds are magnesium chlorides or magnesium bromides. Examples of magnesium compounds from which the halides can be obtained are magnesium alkyls, magnesium aryls, magnesium alkoxides and magnesium aryloxides and Grignard compounds. Suitable halogenating agents are, for example, halogens, hydrogen halides, $SiCl_4$ or $CCl_4$ and preferably chlorine or hydrogen chloride.

Examples of suitable halogen-free compounds of magnesium are diethylmagnesium, di-n-propylmagnesium, diisopropylmagnesium, di-n-butylmagnesium, di-secbutylmagnesium, di-tert-butylmagnesium, diamylmagnesium, n-butylethylmagnesium, n-butyl-sec-butylmagnesium, n-butyloctylmagnesium, diphenylmagnesium, diethoxymagnesium, di-n-propyloxymagnesium, diisopropyloxymagnesium, di-n-butyloxymagnesium, di-sec-butyloxymagnesium, di-tert-butyloxymagnesium, diamyloxymagnesium, n-butyloxyethoxymagnesium, n-butyloxy-sec-butyloxymagnesium, n-butyloxyoctyloxymagnesium and diphenoxymagnesium. Among these, preference is given to using n-butylethylmagnesium or n-butyloctylmagnesium.

Examples of Grignard compounds are methylmagnesium chloride, ethylmagnesium chloride, ethylmagnesium bromide, ethylmagnesium iodide, n-propylmagnesium chloride, n-propylmagnesium bromide, n-butylmagnesium chloride, n-butylmagnesium bromide, sec-butylmagnesium chloride, sec-butylmagnesium bromide, tert-butylmagnesium chloride, tert-butylmagnesium bromide, hexylmagnesium chloride, octylmagnesium chloride, amylmagnesium chloride, isoamylmagnesium chloride, phenylmagnesium chloride and phenylmagnesium bromide.

Apart from magnesium dichloride and magnesium dibromide, particular preference is given to using di($C_1$–$C_{10}$-alkyl)magnesium compounds as magnesium compounds for preparing the particulate solids.

The preparation of the catalyst systems of the present invention is preferably carried out using from 0.5 to 2.0 mol, in particular from 0.5 to 1.5 mol and particularly preferably from 0.5 to 1.0 mol, of the magnesium compounds per mole of the inorganic oxide.

In addition to the magnesium compounds, it is also possible to use at least one internal electron donor compound in the preparation of the particulate solids. Examples of suitable internal electron donor compounds are mono-functional or polyfunctional carboxylic acids, carboxylic anhydrides or carboxylic esters, also ketones, ethers, alcohols, lactones or organophosphorus or organosilicon compounds.

Preference is given to carboxylic acid derivatives and in particular phthalic acid derivatives of the formula (I)

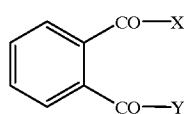

where X and Y are each a chlorine or bromine atom or a $C_1$–$C_{10}$-alkoxy radical or are together oxygen in an anhydride function. Particularly preferred internal electron donor compounds are phthalic esters in which X and Y is a $C_1$–$C_8$-alkoxy radical, for example a methoxy, ethoxy, n-propyloxy, isopropyloxy n-butyloxy, sec-butyloxy, isobutyloxy or tert-butyloxy radical. Examples of phthalic esters which are preferably used are diethyl phthalate, di-n-butyl phthalate, diisobutyl phthalate, di-n-pentyl phthalate, di-n-hexyl phthalate, di-n-heptyl phthalate, di-n-octyl phthalate and di-2-ethylhexyl phthalate.

Further preferred internal electron donor compounds are diesters of 3- or 4-membered, substituted or unsubstituted cycloalkane-1,2-dicarboxylic acids, and also monoesters of substituted benzophenone-2-carboxylic acids or substituted benzophenone-2-carboxylic acids. As hydroxy compounds in these esters, use is made of the alkanols customary in esterification reactions, for example $C_1$–$C_{15}$-alkanols or $C_5$–$C_7$-cycloalkanols, which may in turn bear one or more $C_1$–$C_{10}$-alkyl groups, also $C_6$–$C_{10}$-phenols.

It is also possible to use mixtures of various electron donor compounds.

If internal electron donor compounds are used in the preparation of the particulate solids, use is generally made of from 0.05 to 2.0 mol, preferably from 0.2 to 0.5 mol, of the electron donor compounds per mole of the magnesium compounds.

Furthermore, the preparation of the particulate solids can also be carried out using $C_1$–$C_8$-alkanols such as methanol, ethanol, n-propanol, isopropanol, n-butanol, sec-butanol, tert-butanol, isobutanol, n-hexanol, n-heptanol, n-octanol or 2-ethylhexanol or mixtures thereof, among which ethanol is preferred.

The catalyst systems of the present invention can be prepared by methods known per se.

The following two-stage process is preferably employed:

In the first step, the inorganic oxide is firstly mixed in an inert solvent, preferably a liquid alkane or an aromatic hydrocarbon such as toluene or ethylbenzene, with a solution of the magnesium compound, after which this mixture is allowed to react for from 0.5 to 5 hours at from 10 to 120° C., generally while stirring. Subsequently, usually while stirring continually, a halogenating agent such as chlorine or hydrogen chloride is added in an at least two-fold molar excess, preferably in an at least five-fold molar excess, based on the magnesium-containing compound, and the mixture is allowed to react for from about 30 to 120 minutes. The $C_1$–$C_8$-alkanol and the transition metal compound, preferably a titanium compound, and the internal electron donor compound are then added at from –20 to 150° C. The transition metal compound and the internal electron donor compound can be added at the same time as the $C_1$–$C_8$-alkanol, but it is also possible firstly to allow the $C_1$–$C_8$-alkanol to react with the intermediate for from about 10 to 120 minutes at from 0 to 100° C. Per mole of magnesium, use is made of from 1 to 5 mol, preferably from 1.6 to 4 mol, of the $C_1$–$C_8$-alkanol, from 1 to 15 mol, preferably from 2 to 10 mol, of the titanium compound and from 0.01 to 1 mol, preferably from 0.2 to 0.5 mol, of the internal electron donor compound. This mixture is allowed to react for at least 10 minutes, in particular at least 30 minutes, at from 10 to 150° C., preferably from 60 to 130° C., generally while stirring. The solid obtained in this way is subsequently filtered off and washed with a $C_7$–$C_{10}$-alkylbenzene, preferably ethylbenzene.

In the second step, the solid obtained from the first step is extracted with excess titanium tetrachloride or an excess of a solution of titanium tetrachloride in an inert solvent, preferably a $C_7$–$C_{10}$-alkylbenzene, at from 100 to 150° C. In the case of a solution, this contains at least 5% by weight of titanium tetrachloride. The extraction is generally carried out for at least 30 minutes. The product is then washed with a liquid alkane until the titanium tetrachloride content of the washings is less than 2% by weight.

The solid component a) preferably has a molar ratio of the inorganic oxide to the compound of titanium or vanadium in the range from 1000 to 1, in particular from 100 to 2 and particularly preferably from 50 to 3.

An advantage of the catalyst systems of the present invention is that films of 1-alkene polymers prepared using these catalyst systems have fewer microspecks, and the fiber products obtained therefrom display a reduction in troublesome impurities, which results in an increase in the operating lives of the polymer melt filtration screens. However, this is not associated with a decrease in the catalyst productivity, but instead an increased productivity is observed. With regard to the film quality, it is assumed that the microspecks are to at least some extent caused by large, unfragmented solid particles. It should be thus be possible to reduce the number of microspecks by reducing the mean particle size $\bar{d}$ of the primary particles. In actual practice, however, solids consisting exclusively of very small primary particles and having a high proportion of colloidal inorganic oxide have a high packing density which prevents immobilization of the active component owing to the lack of pores and channels, so that both an increase in the microspecks and a decrease in the catalyst productivity are observed.

The use of porous inorganic oxides having the above-described properties enables the immobilization capacity of the active components, i.e. the magnesium chloride, the titanium compound and the electron donor, to be greatly increased, as a result of which the active components are distributed more homogeneously over the inorganic oxide matrix and the amount of inorganic oxide as a proportion of the total particulate solid component a) can be reduced.

Furthermore, use of inorganic oxides having a reduced mean particle diameter (of the agglomerate) enables a further significant improvement in the immobilization capacity of the active component and thus an increase in the productivity compared to an inorganic oxide having the same primary particle distribution and the same morphological structure but a greater mean particle diameter (of the agglomerate) to be achieved.

The catalyst systems of the present invention can be used, in particular, for the polymerization of 1-alkenes. The 1-alkenes include, inter alia, linear or branched $C_2$–$C_{10}$-alk-1-enes, in particular linear $C_2$–$C_{10}$-alk-1-enes such as ethylene, propylene, 1-butene, 1-pentene, 1-hexene, 1-heptene, 1-octene, 1-nonene, 1-decene or 4-methyl-1-pentene. It is also possible to polymerize mixtures of these 1-alkenes.

In addition to the solid component a), the catalyst systems of the present invention further comprise at least one cocatalyst. A suitable cocatalyst is the aluminum compound b). Preference is given to using an external electron donor compound c) in addition to this aluminum compound b).

Suitable aluminum compounds b) are trialkylaluminums and also compounds which are derived therefrom and in which an alkyl group is replaced by an alkoxy group or by a halogen atom, for example chlorine or bromine. The alkyl groups can be identical or different. Linear or branched alkyl groups are possible. Preference is given to using trialkylaluminum compounds whose alkyl groups each have from 1 to 8 carbon atoms, for example trimethylaluminum, triethylaluminum, triisobutylaluminum, trioctylaluminum or methyldiethylaluminum or mixtures thereof.

In addition to the aluminum compounds b), it is possible to use external electron donor compounds c) as further cocatalysts, for example monofunctional or polyfunctional carboxylic acids, carboxylic anhydrides and carboxylic esters, also ketones, ethers, alcohols, lactones and organophosphorus and organosilicon compounds. The external electron donor compounds c) can be identical to or different from the internal electron donor compounds used for preparing the catalyst solid a). Preferred external electron donor compounds c) are organosilicon compounds of the formula (II)

$$R^1{}_n Si(OR^2)_{4-n} \quad (II)$$

where $R^1$ are identical or different and are each a $C_1$–$C_{20}$-alkyl group, a 5- to 7-membered cycloalkyl group which may in turn bear $C_1$–$C_{10}$-alkyl groups as substituents, a $C_6$–$C_{18}$-aryl group or a $C_6$–$C_{18}$-aryl-$C_1$–$C_{10}$-alkyl group, $R^2$ are identical or different and are each a $C_1$–$C_{20}$-alkyl groups and n is 1, 2 or 3. Particular preference is given to compounds in which $R^1$ is a $C_1$–$C_8$-alkyl group or a 5- to 7-membered cycloalkyl group and $R^2$ is a $C_1$–$C_4$-alkyl group and n is 1 or 2.

Among these compounds, particular mention should be made of diisopropyldimethoxysilane, isobutylisopropyldimethoxysilane, diisobutyldimethoxysilane, dicyclopentyldimethoxysilane, dicyclohexyldimethoxysilane, cyclohexylmethyldimethoxysilane, isopropyl-tert-butyldimethoxysilane, isobutyl-sec-butyldimethoxysilane and isopropyl-sec-butyldimethoxysilane.

The compounds b) and c) acting as cocatalysts can be allowed to act either individually, in succession in any order or together as a mixture on the catalyst solid a). This usually occurs at from 0 to 150° C., in particular from 20 to 90° C., and pressures of from 1 to 100 bar, in particular from 1 to 40 bar.

The cocatalysts b) are preferably used in such an amount that the atomic ratio of aluminum from the aluminum compound b) to the transition metal from the catalyst solid a) is from 10:1 to 800:1, in particular from 20:1 to 200:1.

The catalyst systems comprising a catalyst solid a) and, as cocatalysts, at least one aluminum compound b) or at least one aluminum compound b) and at least one further electron donor compound c) are very useful for the preparation of propylene polymers, both homopolymers of propylene and copolymers of propylene with one or more other 1-alkenes having up to 10 carbon atoms. For the purposes of the present invention, the copolymers may be ones in which the other 1-alkenes having up to 10 carbon atoms are randomly incorporated. The comonomer content is then generally less than 15% by weight. However, it is also possible for the propylene copolymers to be in the form of block copolymers or impact-modified copolymers. These generally comprise at least one matrix of a propylene homopolymer or a random propylene copolymer with less than 15% by weight of other 1-alkenes having up to 10 carbon atoms and a soft phase made up of a propylene copolymer containing from 15 to 80% by weight of other 1-alkenes having up to 10 carbon atoms in copolymerized form. Preferred comonomers are in each case ethylene or 1-butene. However, it is also possible to use mixtures of comonomers, so that, for example, terpolymers of propylene are obtained.

The preparation of the propylene polymers can be carried out in the customary reactors suitable for the polymerization of 1-alkenes, either batchwise or preferably continuously, for example in solution, as a suspension polymerization or as a gas-phase polymerization. Examples of suitable reactors are continuously operated stirred reactors, loop reactors, fluidized-bed reactors or horizontally or vertically stirred powder bed reactors. Of course, the reaction can also be carried out in a plurality of reactors connected in series. The reaction time depends critically on the reaction conditions selected in each case. It is usually from 0.2 to 20 hours, mostly from 0.5 to 10 hours.

The polymerization is generally carried out at from 20 to 150° C., preferably from 50 to 120° C. and in particular from 60 to 90° C., and a pressure of from 1 to 100 bar, preferably from 15 to 40 bar and in particular from 20 to 35 bar.

The molar mass of the propylene polymers formed can be controlled by addition of regulators customary in polymerization technology, for example hydrogen, and adjusted over a wide range. It is also possible for inert solvents such as toluene or hexene, inert gases such as nitrogen or argon and relatively small amounts of polypropylene powder to be additionally used.

The mean molar masses (weight average) of the propylene polymers are generally in the range from 10,000 to 1,000,000 g/mol and the melt flow rates (MFR) are in the range from 0.1 to 100 g/10 min, preferably from 0.5 to 50 g/10 min. The melt flow rate corresponds to the amount of polymer which is extruded over a period of 10 minutes from the standardized test apparatus specified in ISO 1133 at 230° C. under a weight of 2.16 kg.

Compared to previously known catalyst systems, the catalyst systems of the present invention make it possible to prepare 1-alkene polymers which have a good morphology and a high bulk density and which tend to form significantly fewer microspecks in film production. Furthermore, they effect a reduction in the pressure rise during melt filtration. In addition, the productivity of the catalyst systems of the present invention is increased.

Owing to their good mechanical properties, the polymers obtainable using the particulate solids according to the present invention, in particular the homopolymers of propylene or copolymers of propylene with one or more other 1-alkenes having up to 10 carbon atoms, are suitable for the production of films, fibers or moldings and especially for the production of films.

EXAMPLES

To characterize the products, the following tests were carried out:

Determination of the Mean Particle Diameter $\overline{D}$

To determine the mean particle diameter $\overline{D}$ of the silica gels, the particle size distribution of the silica gel particles was determined by Coulter Counter analysis in accordance with ASTM Standard D 4438 and the volume-based mean (median) was calculated therefrom.

Determination of the Mean Particle Diameter $\overline{d}$ of the Primary Particles, the Distribution of the Particle Diameters d of the Primary Particles and the Macroscopic Proportion of Voids or Channels Having a Diameter of Greater Than 1 μm The determination of the mean particle diameter of the primary particles, the distribution of the particle diameters d of the primary particles and the macroscopic proportion of voids or channels having a diameter of greater than 1 μm in the silica gels used was carried out by means of scanning electron microscopy on cross sections of silica gel particles. The electron micrographs obtained were converted into a binary image and the particles were "electronically" fragmented by means of the analysis software package from SIS. The separated particles were electronically classified according to size and counted. About 200 particles in each case were used to calculate the particle size distribution of the primary particles, from which the mean particle diameter $\overline{d}$, the proportion of particles having a diameter d of greater than 20 μm, the proportion of particles having a diameter d of greater than 15 μm and the proportion of primary particles having particle diameters d of less than 5 μm was derived. In addition, the precise proportion of voids or channels having a diameter of greater than 1 μm within the particles was determined.

Determination of the Specific Surface Area

By nitrogen adsorption in accordance with DIN 66131

Determination of the Pore Volume

By mercury porosimetry in accordance with DIN 66133

Determination of the pH

The pH of the silica gel was determined by means of the method described in S. R. Morrison, "The Chemical Physics of Surfaces", Plenum Press, New York [1977], page 130 et seq.

Determination of the Water Content

To determine the water content, 5 g of silica gel were dried for 120 minutes at 160° C. under atmospheric pressure (to constant weight). The weight loss corresponded to the original water content.

Determination of the Productivity

The productivity is the amount of polymer in gram which was obtained per gram of titanium-containing solid component a) used.

Determination of the Melt Flow Rate (MFR)

ISO Standard 1133, at 230° C. and under a weight of 2.16 kg.

Determination of the Number of Microspecks

The number of microspecks per unit area was determined optically on-line during film production by means of a Brabender CCD camera.

Determination of the Pressure Rise During Melt Filtration

The determination of the pressure rise during melt filtration is carried out by extrusion of the polypropylene products in a standard laboratory extruder (3-zone screw) at 265° C. through a metal filter disk with a support mesh having a mesh opening of 5 μm at a throughput of 2 kg/h. The pressure rise at equal polypropylene throughputs is recorded as a function of time.

Example 1

1. Preparation of the Catalyst Solid

As inorganic particulate oxide, use was made of a spheroidal silica gel ($SiO_2$) having a mean particle diameter $\overline{D}$ of 60 μm and a proportion of voids or channels having a diameter of greater than 1 μm of 17.4% by volume. The mean particle diameter $\overline{d}$ of the primary particles was 6.1 μm. The primary particles had a narrow particle size distribution, which was reflected in the fact that the proportion of particles having a particle diameter d of greater than 15 μm was only 7.8% by volume, that of particles having a particle diameter d of greater than 20 μm was only 2.2% by volume and that of particles having a particle diameter d of less than 5 μm was only 38% by volume. The silica gel also had a specific surface area of 505 m²/g, a pore volume of 1.8 cm³/g, a pH of 5.5 and a water content of 2.1% by weight.

The silica gel was admixed with a solution of n-butyloctylmagnesium in a mixture of n-heptane and ethylbenzene (heptane content: 33%), using 0.5 mol of the magnesium compound per mole of $SiO_2$. The mixture was stirred for 30 minutes at 95° C., then cooled to 20° C., after which 10 times the molar amount, based on the organomagnesium compound, of hydrogen chloride was passed in. After 60 minutes, the reaction product was admixed with 2.5 mol of ethanol per mole of magnesium while stirring continually. This mixture was stirred for 0.5 hour at 80° C. and subsequently admixed with 6.0 mol of titanium tetrachloride and 0.45 mol of di-n-butyl phthalate, in each case based on 1 mol of magnesium. The mixture was subsequently stirred for 1 hour at 100° C., and the solid obtained in this way was filtered off and washed a number of times with ethylbenzene.

The solid product obtained was extracted for 3 hours at 125° C. with a 10% strength by volume solution of titanium tetrachloride in ethylbenzene. The solid product was then separated from the extractant by filtration and washed with n-heptane until the extractant contained only 0.3% by weight of titanium tetrachloride.

The catalyst solid a) prepared in this way contained 4.1% by weight of Ti 8.3% by weight of Mg 33.4% by weight of Cl.

1.2 Polymerization

In a vertically stirred gas-phase reactor having a utilizable capacity of 800 l, propylene was polymerized in the presence of hydrogen as molar mass regulator. The reactor contained an agitated fixed bed of finely divided polymer. The output of polymer from the reactor was 150 kg of polypropylene per hour.

Gaseous propylene was passed into the gas-phase reactor at 80° C. and a pressure of 32 bar. At a mean residence time of 1.5 hours, polymerization was carried out continuously with the aid of the catalyst solid a) described under 1.1, using 6.5 g/h of the catalyst solid a), 300 mmol/h of triethylaluminum b) and 7.5 mmol/h of isobutylisopropyldimethoxysilane c) as cocatalyst. A productivity based on the catalyst solid a) of 24,000 g of polypropylene/g of solid component was achieved.

The gas-phase polymerization gave a propylene homopolymer having a melt flow rate (MFR) of 10 g/10 min.

1.3 Production of an Extruded Film

A 40 µm thick extruded film was produced from the propylene homopolymer obtained under 1.2 by means of a single-screw extruder at a melt temperature of 190° C. and a throughput of 2.5 kg/h. The film obtained had 760 microspecks per m$^2$.

Example 2

The preparation of the catalyst solid a) is carried out using the same procedure as in Example 1, except that the mean particle diameter of the silica gel used is 45 µm, the macroscopic proportion of pores and channels having a diameter of greater than 1 µm is 16.3% by volume, the mean particle diameter of the primary particles is 6.3 µm and the proportion of the primary particles having a particle diameter d of greater than 20 µm or 15 µm is 1.5% or 5.4%, respectively. The proportion of primary particles having a particle diameter d of less than 5 µm is 43% by volume. Furthermore, the silica gel has a specific surface area of 521 m$^2$/g (BET), a pore volume of 1.69 ml/g, a pH of 5.5 and a water content of 2.1% by weight. 0.67 mol of magnesium compound was used per mole of silica gel.

The catalyst solid a) prepared in this way contained:

4.1% by weight of Ti 10.0% by weight of Mg 36.7% by weight of Cl

The polymerization of propylene was carried out in the same way as described in Section 1.2 of Example 1.

Example 3

The preparation of the catalyst solid a) is carried out by the same procedure as in Example 1, except that the mean particle diameter of the silica gel used is 20 µm, the macroscopic proportion of pores and channels having a diameter of greater than 1 µm is 16.9% by volume, the mean particle diameter of the primary particles is 4.2 µm and the proportion of primary particles having a particle diameter d of greater than 20 µm or 15 µm is 0.8% or 4.3%, respectively. The proportion of primary particles having a particle diameter d of less than 5 µm is 64% by volume. Furthermore, the silica gel has a specific surface area of 495 m$^2$/g (BET), a pore volume of 1.74 mg/g, a pH of 5.5 and a water content of 2.1% by weight. 1.0 mol of magnesium compound was used per mole of silica gel.

The catalyst solid a) prepared in this way contained:

3.8% by weight of Ti 10.9% by weight of Mg 40.6% by weight of Cl

The polymerization of propylene was carried out in the same way as described in Section 1.2 of Example 1.

Comparative Example A

The preparation of the catalyst solid a) is carried out using the same procedure as in Example 1, except that the mean particle diameter of the silica gel used is 45 µm, the macroscopic proportion of pores and channels having a diameter of greater than 1 µm is 6.7% by volume, the mean particle diameter of the primary particles is 8.5 µm and the proportion of primary particles having a particle diameter d of greater than 20 µm or 15 µm is 7.7% or 17.4%, respectively. The proportion of primary particles having a particle diameter d of less than 5 µm is 15.4% by volume. Furthermore, the silica gel has a specific surface area of 309 m$^2$/g (BET), a pore volume of 1.36 ml/g, a pH of 5.9 and a water content of 2.3% by weight. 0.37 mol of magnesium compound was used per mole of silica gel.

The catalyst solid a) prepared in this way contained:

3.5% by weight of Ti 7.5% by weight of Mg 28.4% by weight of Cl

The polymerization of propylene was carried out in the same way as described in Section 1.2 of Example 1.

Comparative Example B

The preparation of the catalyst solid a) was carried out using the same procedure as in Example 1, except that the mean particle diameter of the silica gel used is 80 µm, the macroscopic proportion of pores and channels having a diameter of greater than 1 µm is 18.3% by volume, the mean particle diameter of the primary particles is 7.1 µm and the proportion of primary particles having a diameter d of greater than 20 µm or 15 µm is 2.5% or 9.1%, respectively. The proportion of primary particles having a particle diameter d of less than 5 µm is 27% by volume. Furthermore, the silica gel has a specific surface area of 516 m$^2$/g (BET), a pore volume of 1.69 ml/g, a pH of 5.5 and a water content of 2.1% by weight. 0.5 mol of magnesium compound was used per mole of silica gel.

The catalyst solid a) prepared in this way contained:

3.4% by weight of Ti 8.0% by weight of Mg 34.7% by weight of Cl

The polymerization of propylene was carried out in the same way as described in Section 1.2 of Example 1.

The results of the measurements on the propylene homopolymer obtained in Examples 1 to 3 and in Comparative Examples A and B are shown in the following table.

|  | Example 1 | Example 2 | Example 3 | Comparative Example A | Comparative Example B |
|---|---|---|---|---|---|
| Mean particle diameter ($\overline{D}$) [µm] | 60 | 45 | 20 | 45 | 80 |
| Mg/SiO$_2$ ratio [mol/mol] (max.) | 0.5 | 0.67 | 1.0 | 0.37 | 0.5 |
| Specific surface area (BET) [m$^2$/g] | 505 | 521 | 495 | 309 | 516 |

-continued

| | Example 1 | Example 2 | Example 3 | Comparative Example A | Comparative Example B |
|---|---|---|---|---|---|
| Proportion of channels and pores > 1 μm (% by volume) | 17.4 | 16.3 | 16.9 | 6.7 | 18.3 |
| Mean primary particle diameter ($\bar{d}$) [μm] | 6.1 | 6.3 | 4.2 | 8.5 | 7.1 |
| Proportion with $\overline{D}$ > 20 μm (% by volume) | 2.2 | 1.5 | 0.8 | 7.7 | 2.5 |
| Proportion with $\overline{D}$ > 15 μm (% by volume) | 7.8 | 5.4 | 4.3 | 17.4 | 9.1 |
| Proportion with $\overline{D}$ < 5 μm (% by volume) | 38 | 43 | 64 | 15.4 | 27 |
| Productivity [g of PP/g of catalyst solid] | 24,000 | 27,000 | 29,000 | 18,000 | 22,000 |
| Melt flow rate MFR [g/10 min] | 10 | 10 | 9.3 | 12 | 12 |
| Number of microspecks [per m²] | 760 | 530 | 360 | 4995 | 970 |
| Pressure rise during melt filtration [bar/kg PP] | 20 | 13 | 5 | 34 | 22 |

The silica gels used in Examples 1 to 3 have a comparable morphology in respect of the composition and the primary particle distribution, taking into account the different agglomerate diameters. Specific surface areas and the macroscopic proportion of pores and channels having a diameter of more than 1 μm are all in the same range, so that the size effect of the agglomerates is particularly clear in Examples 1, 2 and 3. The loading capacity of the silica gel with active component is exploited right up to the maximum in Examples 1,2 and 3. It becomes clear that as the agglomerate diameter decreases below 60 μm, the ratio of magnesium compound (=part of the active component) to silica gel support can be increased significantly, which is reflected in a significant rise in the productivity in the polymerization of propylene. Furthermore, the improved removal of the heat of polymerization (ratio of surface area to volume increases as the agglomerate diameter drops) enables the catalyst to maintain its productivity better over the polymerization time.

A further positive effect of a smaller agglomerate diameter and increased loading is the reduction in the number of microspecks, which is also reflected in reduced pressure increases during melt filtration (a higher pressure increase means a poorer polymer quality).

Comparison of Examples 1 to 3 according to the present invention and comparative Examples A and B indicates that, inter alia, the catalyst system of the present invention displays an increased productivity compared to the catalyst systems of the prior art. The propylene homopolymers resulting from Examples 1 to 3 also have a greatly reduced number of microspecks, which is very advantageous for the production of films. The quality of the propylene homopolymer obtained in Examples 1 to 3 according to the present invention is also demonstrated by the relatively low pressure increase during melt filtration, which is advantageous in the production of fiber products.

We claim:

1. A catalyst system of the Ziegler-Natta type comprising as active constituents a) a solid component comprising a compound of titanium or vanadium, a compound of magnesium, a particulate inorganic oxide as support and an internal electron donor compound, and as cocatalyst b) an aluminum compound and c) if desired, a further, external electron donor compound, wherein the particulate, inorganic oxide used has a specific surface area of from 350 to 1000 m²/g and a mean particle diameter $\overline{D}$ in the range from 5 to 60 μm and comprises particles which are composed of primary particles having a mean particle diameter $\bar{d}$ in the range from 1 to 10 μm and contain voids or channels between the primary particles, where the macroscopic proportion of voids or channels having a diameter of greater than 1 μm in the particles of the inorganic oxides is in the range from 5 to 30% by volume and the molar ratio of the compound of magnesium to the particulate, inorganic oxide is from 0.5:1 to 2.0:1.

2. A catalyst system as claimed in claim 1, wherein the particulate inorganic oxide used additionally meets at least one of the following conditions:

(I) less than 10% by volume of the primary particles have a particle diameter d of more than 15 μm or (II) less than 5% by volume of the primary particles have a particle diameter d of more than 20 μm.

3. A catalyst system as claimed in claim 1, wherein the particulate inorganic oxide is obtained by spray drying.

4. A catalyst system as claimed in claim 1, wherein the particulate, inorganic oxide is an oxide of silicon, aluminum or titanium or an oxide of a metal of main group I or II of the Periodic Table or a mixture of such oxides.

5. A catalyst system as claimed in claim 1, wherein the internal electron donor compound used is a carboxylic ester.

6. A catalyst system as claimed in claim 1, wherein an organosilicon compound is used as external electron donor compound c).

7. A catalyst system as claimed in claim 1, wherein the aluminum compound b) used is a trialkylaluminum.

8. A process for preparing homopolymers of propylene or copolymers of propylene with one or more other 1-alkenes having up to 10 carbon atoms, wherein the polymerization is carried out in the presence of a catalyst system as claimed in claim 1.

9. A homopolymer of propylene or a copolymer of propylene with one or more other 1-alkenes having up to 10 carbon atoms, obtainable by polymerization of the corresponding monomers in the presence of a catalyst system as claimed in claim 1.

10. A film, fiber or molding obtainable from a homopolymer of propylene or a copolymer of propylene with one or more other 1-alkenes having up to 10 carbon atoms as claimed in claim 9.

* * * * *